United States Patent
Fullagar et al.

(10) Patent No.: US 11,252,211 B2
(45) Date of Patent: Feb. 15, 2022

(54) MANAGING CONTENT ON AN ISP CACHE

(71) Applicant: NETFLIX, INC., Los Gatos, CA (US)

(72) Inventors: David Fullagar, Boulder, CO (US); Kenneth W. Florance, Santa Cruz, CA (US); Ian Van Hoven, Portola Valley, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 16/740,344

(22) Filed: Jan. 10, 2020

(65) Prior Publication Data

US 2020/0153883 A1 May 14, 2020

Related U.S. Application Data

(60) Division of application No. 16/246,413, filed on Jan. 11, 2019, now Pat. No. 10,536,498, which is a (Continued)

(51) Int. Cl.
*H04L 29/06* (2006.01)
*G06F 16/958* (2019.01)
(Continued)

(52) U.S. Cl.
CPC ........ *H04L 65/4084* (2013.01); *G06F 15/167* (2013.01); *G06F 16/9574* (2019.01);
(Continued)

(58) Field of Classification Search
CPC . H04L 65/4084; H04L 67/2847; H04L 67/18; H04L 67/2852; H04L 67/306; G06F 16/972; G06F 16/9574; G06F 15/167; H04N 21/25841; H04N 21/2181; H04N 21/2223; H04N 21/237; H04N 21/252; H04N 21/25891; H04N 21/6125; G06Q 10/00
See application file for complete search history.

(56) References Cited

U.S. PATENT DOCUMENTS

| 6,021,331 A | 2/2000 | Cooper et al. |
| 6,449,695 B1 | 9/2002 | Bereznyi et al. |

(Continued)

FOREIGN PATENT DOCUMENTS

EP 2053831 A1 4/2009

*Primary Examiner* — Jonathan A Bui
(74) *Attorney, Agent, or Firm* — Artegis Law Group, LLP

(57) ABSTRACT

One embodiment of the present invention sets forth a method for updating content stored in a cache residing at an internet service provider (ISP) location that includes receiving popularity data associated with a first plurality of content assets, where the popularity data indicate the popularity of each content asset in the first plurality of content assets across a user base that spans multiple geographic regions, generating a manifest that includes a second plurality of content assets based on the popularity data and a geographic location associated with the cache, where each content asset included in the manifest is determined to be popular among users proximate to the geographic location or users with preferences similar to users proximate to the geographic location, and transmitting the manifest to the cache, where the cache is configured to update one or more content assets stored in the cache based on the manifest.

19 Claims, 4 Drawing Sheets

Related U.S. Application Data division of application No. 14/846,723, filed on Sep. 4, 2015, now Pat. No. 10,182,090, which is a continuation of application No. 13/710,169, filed on Dec. 10, 2012, now Pat. No. 9,128,892.

(51) Int. Cl.

| | | |
|---|---|---|
| *G06F 16/957* | (2019.01) | |
| *H04N 21/218* | (2011.01) | |
| *H04N 21/222* | (2011.01) | |
| *H04N 21/237* | (2011.01) | |
| *H04N 21/25* | (2011.01) | |
| *H04N 21/258* | (2011.01) | |
| *H04N 21/61* | (2011.01) | |
| *H04L 29/08* | (2006.01) | |
| *G06F 15/167* | (2006.01) | |
| *G06Q 10/00* | (2012.01) | |

(52) U.S. Cl.
CPC ........... *G06F 16/972* (2019.01); *G06Q 10/00* (2013.01); *H04L 67/18* (2013.01); *H04L 67/2847* (2013.01); *H04L 67/2852* (2013.01); *H04N 21/2181* (2013.01); *H04N 21/2223* (2013.01); *H04N 21/237* (2013.01); *H04N 21/252* (2013.01); *H04N 21/25841* (2013.01); *H04N 21/25891* (2013.01); *H04N 21/6125* (2013.01); *H04L 67/306* (2013.01)

(56) References Cited

U.S. PATENT DOCUMENTS

| | | | |
|---|---|---|---|
| 6,687,793 B1 | 2/2004 | Thomas et al. | |
| 6,721,490 B1* | 4/2004 | Yao | H04N 21/23106 348/E5.008 |
| 6,917,960 B1 | 7/2005 | Decasper et al. | |
| 7,222,354 B1* | 5/2007 | Ching | H04N 7/165 725/35 |
| 7,426,687 B1 | 9/2008 | Schultz et al. | |
| 8,239,446 B2* | 8/2012 | Navar | H04L 67/26 709/203 |
| 8,341,255 B2 | 12/2012 | Gopalakrishnan | |
| 8,380,676 B1 | 2/2013 | Eastham et al. | |
| 9,251,147 B2* | 2/2016 | Ku | H04W 4/023 |
| 2002/0092026 A1 | 7/2002 | Janniello et al. | |
| 2002/0143984 A1 | 10/2002 | Hudson Michel | |
| 2002/0161767 A1 | 10/2002 | Shapiro et al. | |
| 2003/0115346 A1* | 6/2003 | McHenry | H04L 67/2847 709/229 |
| 2003/0126056 A1 | 7/2003 | Hausman et al. | |
| 2003/0204602 A1* | 10/2003 | Hudson | H04L 67/06 709/228 |
| 2004/0221019 A1 | 11/2004 | Swildens et al. | |
| 2005/0262246 A1 | 11/2005 | Menon et al. | |
| 2006/0026220 A1 | 2/2006 | Margolus | |
| 2006/0130135 A1 | 6/2006 | Krstulich et al. | |
| 2006/0259690 A1 | 11/2006 | Vittal et al. | |
| 2008/0155057 A1* | 6/2008 | Khedouri | H04N 7/17318 709/217 |
| 2009/0031043 A1 | 1/2009 | Schaade | |
| 2009/0055547 A1 | 2/2009 | Hudson et al. | |
| 2009/0063652 A1 | 3/2009 | Hwang et al. | |
| 2009/0144412 A1* | 6/2009 | Ferguson | H04L 67/14 709/224 |
| 2009/0254661 A1 | 10/2009 | Fullagar et al. | |
| 2010/0017516 A1 | 1/2010 | Sparrell et al. | |
| 2010/0094710 A1 | 4/2010 | Ramakrishna | |
| 2010/0250772 A1 | 9/2010 | Mao | |
| 2010/0312861 A1 | 12/2010 | Kolhi et al. | |
| 2011/0153719 A1* | 6/2011 | Santoro | H04L 43/08 709/203 |
| 2011/0314148 A1 | 12/2011 | Petersen et al. | |
| 2012/0042090 A1 | 2/2012 | Chen et al. | |
| 2012/0079056 A1 | 3/2012 | Turanyi et al. | |
| 2012/0131265 A1 | 5/2012 | Koltsidas et al. | |
| 2012/0159558 A1* | 6/2012 | Whyte | H04N 7/17336 725/95 |
| 2012/0198075 A1* | 8/2012 | Crowe | H04L 67/2885 709/226 |
| 2012/0317235 A1* | 12/2012 | Nguyen | H04N 21/6375 709/219 |
| 2012/0323872 A1 | 12/2012 | Vasquez Lopez et al. | |
| 2013/0041972 A1* | 2/2013 | Field | H04L 67/327 709/213 |
| 2013/0073686 A1* | 3/2013 | Sandholm | G06Q 30/0631 709/219 |
| 2013/0089142 A1* | 4/2013 | Begen | H04N 21/26258 375/240.12 |
| 2013/0138863 A1 | 5/2013 | Tsirkin et al. | |
| 2013/0219005 A1 | 8/2013 | Kotecha et al. | |
| 2013/0238683 A1* | 9/2013 | Wald | H04L 67/1063 709/202 |
| 2014/0068196 A1 | 3/2014 | Benoit et al. | |
| 2014/0280606 A1* | 9/2014 | Long | H04L 67/2842 709/205 |
| 2014/0359081 A1* | 12/2014 | Deventer | H04N 21/6587 709/219 |
| 2015/0271285 A1 | 9/2015 | Hindawi et al. | |
| 2017/0188054 A1* | 6/2017 | Ma | H04L 67/02 |

\* cited by examiner

MANAGING CONTENT ON AN ISP CACHE

CROSS-REFERENCE TO RELATED APPLICATIONS

This application is a divisional of the co-pending U.S. patent application titled "MANAGING CONTENT ON AN ISP CACHE", filed Jan. 11, 2019 and having Ser. No. 16/246,413, which is a divisional of the U.S. patent application titled, "MANAGING CONTENT OF AN ISP CACHE" filed on Sep. 4, 2015 and having Ser. No. 14/846,723, now patent Ser. No. 10/182,090, which is a continuation of U.S. patent application titled, "MANAGING CONTENT ON AN ISP CACHE," filed on Dec. 10, 2012 and having Ser. No. 13/710,169, now U.S. Pat. No. 9,128,892. The subject matter of these related applications is hereby incorporated herein by reference.

BACKGROUND OF THE INVENTION

Field of the Invention

The present invention relates generally to moving and storing data across a network and, more specifically, to managing content on a cache residing at an internet service provider location, internet exchange or other network facility.

Description of the Related Art

Conventional digital content distribution systems include a content server, an application server, a content player, and a communications network connecting the content server to the content player. The content server usually belongs to a content delivery network and is configured to store digital content items corresponding to different content assets that can be downloaded from the content server to the content player. The application server allows a user of the content player to browse through available digital content and manage account information, etc.

One major problem with conventional digital content distribution systems is the high volume of traffic, which results in network congestion, delays in delivering digital content to end-users, and even interruptions of service. To reduce the overall amount of traffic in a digital content distribution system, one ideally would like to store content assets on content servers that are located in the same geographical regions as the end-users requesting those content assets. That way, when an end-user requests a particular content asset, the content asset is already stored locally on a content server, and can be easily delivered to the end-user. Importantly, having to request the content asset from another content server within the content distribution system, which can significantly increase network traffic, is avoided. However, storing content assets on content servers local to the end-users requesting those content assets requires knowledge about which content assets those end-users are likely to request.

Unfortunately, conventional content servers in digital content distribution systems either do not have access to information that provides an understanding of what content assets end-users are likely to request or have access to only a limited amount of such information and, therefore, cannot generate an accurate understanding of what content assets end-users are likely to request. Again, when an end-user requests a content asset that is not stored on the content server receiving the particular request, the content asset has to be requested from a different content server in the network, which undesirably increases network traffic and delays when the end-user is able to access the requested content asset.

As the foregoing illustrates, what is needed in the art is a more efficient way to distribute digital content throughout a digital content distribution system.

SUMMARY OF THE INVENTION

One embodiment of the present invention sets forth a method for updating content stored in a cache residing at an internet service provider (ISP) location. The method includes receiving popularity data associated with a first plurality of content assets, where the popularity data indicate the popularity of each content asset in the first plurality of content assets across a user base that spans multiple geographic regions, generating a manifest that includes a second plurality of content assets based on the popularity data and a geographic location associated with the cache, where each content asset included in the manifest is determined to be popular among users proximate to the geographic location or users with preferences similar to users proximate to the geographic location, and transmitting the manifest to the cache, where the cache is configured to update one or more content assets stored in the cache based on the manifest.

One advantage of the disclosed method is that content assets are stored in an ISP cache local to a user base based on popularity data that identifies which content assets are most popular within that user base. Consequently, the likelihood that users within that user base will request content assets stored in the ISP cache is increased. In cases where requested content assets are stored in the ISP cache, the content assets may be accessed directly from the ISP cache, as opposed to accessing the content assets from content delivery networks or from other sources, thereby reducing overall network traffic and congestion. In addition, updating the content assets stored in the ISP cache, including accessing new titles from content delivery networks, is done during off-peak network traffic hours. By avoiding increases in network traffic during peak network traffic hours, overall network congestion is reduced.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
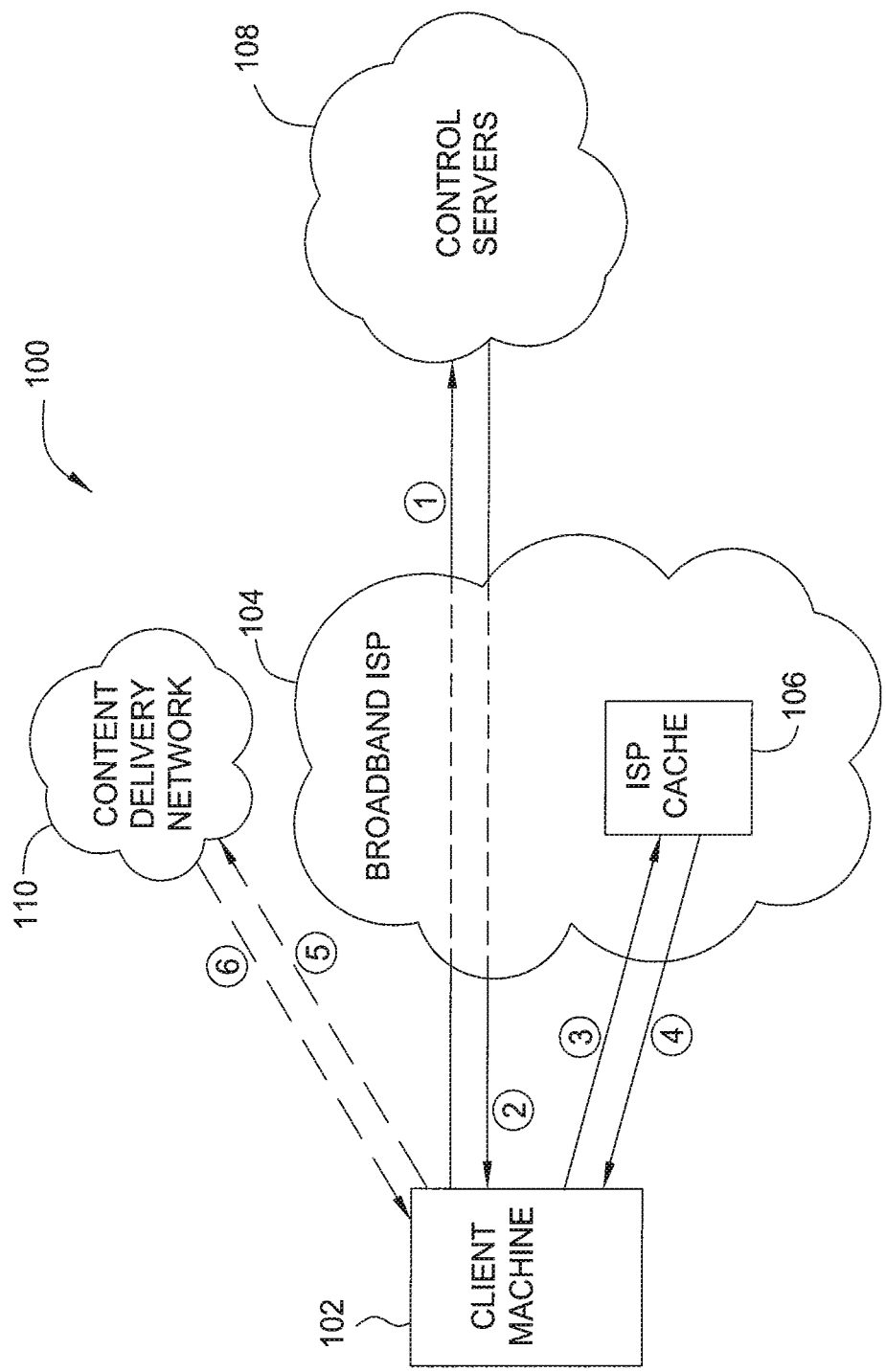
FIG. 1 illustrates a system configured to implement one or more aspects of the present invention.

FIG. 1 illustrates a system 100 configured to implement one or more aspects of the present invention. As shown, system 100 includes, without limitation, a client machine 102, a broadband internet service provider (ISP) network 104 that includes an ISP cache 106, control servers 108, and a content delivery network 110. Client machine 102 may be any device capable of interacting with control servers 108 in order to request and receive a content file stored in ISP cache 106 or within content delivery network 110. Examples of client machine 102 include, without limitation, any type of computing device, such as a desktop computer, a laptop computer, a hand-held computing device, a cellular telephone, a personal digital assistant, or any other computing/computer platform, a set-top box, or a properly configured television or other audio-video device.

Broadband ISP network 104 includes one or more machines (not shown) and is responsible for managing internet traffic within a geographic region that either is proximate to the geographic location of client machine 102 or includes the geographic location of client machine 102. ISP cache 106 resides within broadband ISP network 104 and is configured to store one or more content assets that may be transmitted to client machine 102 for playback in response to one or more requests from client machine 102. Control servers 108 include one or more machines (not shown) and, among other things, are responsible for managing the delivery of one or more content assets to client machine 102 for playback in response to one or more requests for such content assets from client machine 102. Content delivery network 110 also includes one or more machines (not shown) and is configured to store one or more content assets that may be transmitted to client machine 102 for playback in response to one or more requests from client machine 102.

As also shown in FIG. 1, in operation, the process of requesting and receiving a content asset within the framework provided by system 100 may include up to six steps. In step 1, client machine 102 contacts control servers 108 to request a particular content asset. As those skilled in the art will recognize, step 1 may include several other communications between client machine 102 and control servers 108 where, for example, more generic requests for content assets are made by client machine 102, and recommendations responsive to those generic requests are provided by control servers 108 that allow client machine 102 to request a more particularized content asset.

In response to the particular request in step 1, in step 2, content control servers 108 transmit to client machine 102 a customized content asset selection that may include a hierarchical set of locations from where client machine 102 may access the particular content asset. In one embodiment, the primary location in the hierarchical set is ISP cache 106, so the customized content asset selection includes the internet protocol (IP) address associated with ISP cache 106. Preferably, control servers 108 are configured to designate ISP cache 106 as the primary location from where to access the particular content asset when client machine 102 belongs to broadband ISP network 104 and the particular content asset is stored within ISP cache 106. In addition, the customized content asset selection may also include one or more additional locations in the hierarchical set from where the content asset can be accessed such as a content delivery networks, such as content delivery network 110, or other ISP caches within the ISP network 104 or within one or more adjacent networks. In such cases, the customized content asset selection includes the IP addresses or host name associated with the relevant content delivery network or other network storage location and also indicates which content delivery network or other network storage location is the secondary location from where the particular content asset should be retrieved, which content delivery network or other network storage location is the tertiary location from where the particular content asset should be retrieved, and so on. As part of step 2, control servers 108 and client machine 102 also may exchange digital rights management (DRM) keys and other information needed to decrypt the particular content asset on client machine 102.

In step 3, client machine 102, requests the particular content asset from the primary location, ISP cache 106, using the IP address of ISP cache 106 provided in the customized content asset selection received from control servers 108. In step 4, ISP cache 106 transmits the particular content asset to client machine 102 for playback. If, for whatever reason, ISP cache 106 does not have the particular content asset or cannot transmit the particular content asset to client machine 102, then, in step 5, client machine 102 requests the particular content asset from the secondary location set forth in the customized content asset selection, such as content delivery network 110, using the IP address of content delivery network 110 provided in the customized title selection. In response to the request, in step 6, content delivery network 110 transmits the particular title to client machine 102 for playback. In the event that the second location does not have the particular content asset or cannot transmit the particular content asset to client machine 102, then client machine 102 requests the particular content asset from the tertiary location set forth in the customized content asset selection, and so on.

Figure 2:
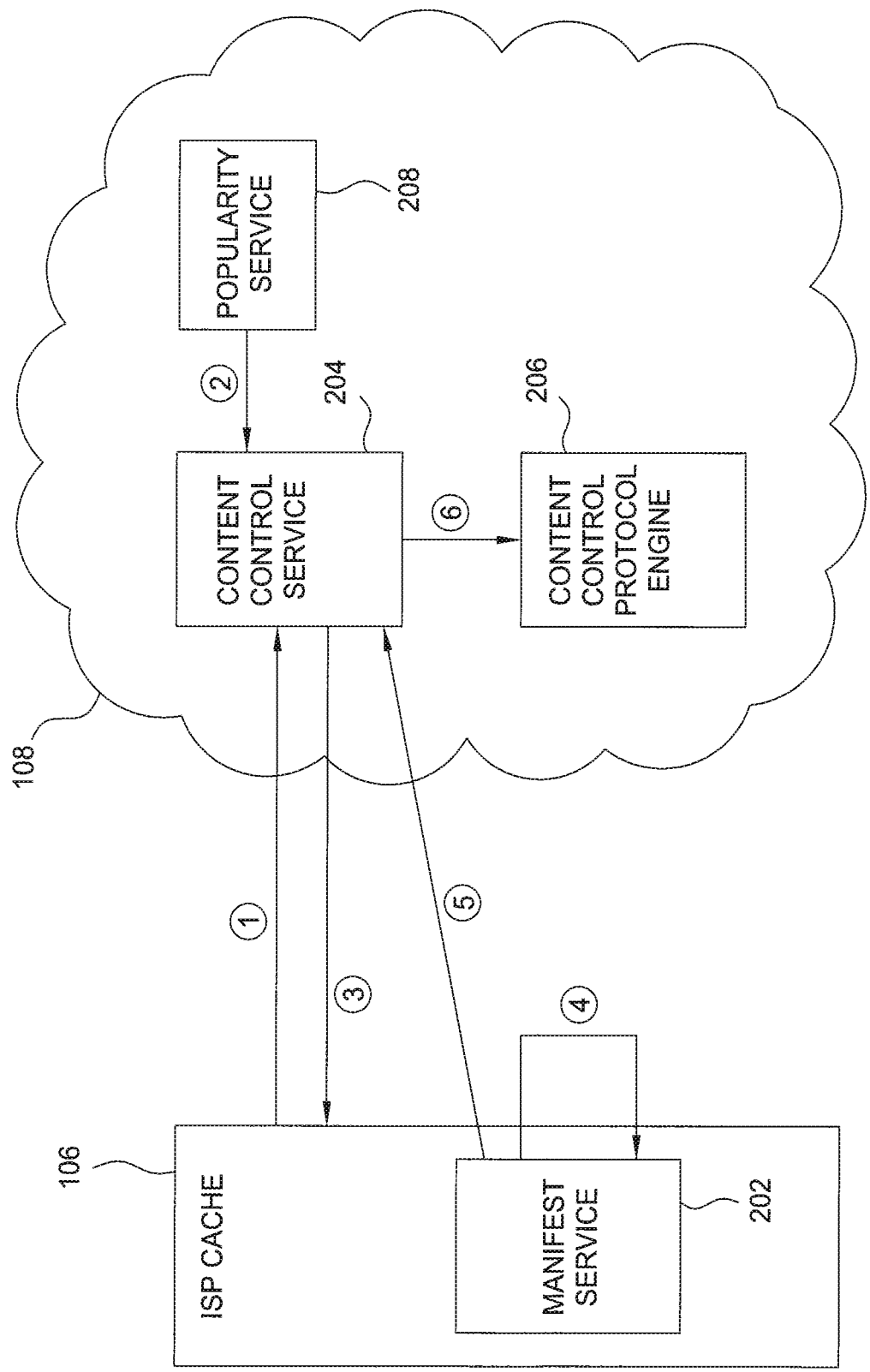
FIG. 2 is a more detailed illustration of the control servers and internet service provider (ISP) cache of FIG. 1, according to one embodiment of the present invention.

FIG. 2 is a more detailed illustration of control servers 108 and ISP cache 106 of FIG. 1, according to one embodiment of the present invention. As shown, control servers 108 include, without limitation, a content control service 204, a content control protocol engine 206, and a popularity service 208, and ISP cache 106 includes a manifest service 202. Content control service 204 resides across one or more machines (not shown) and is responsible for managing which content assets are stored in ISP cache 106. Content control service 204 also is responsible for conveying that information to content control protocol engine 206 to allow content control protocol engine 206 to provide appropriate locations from where various content assets should be accessed by the different client machines requesting content assets via control servers 108.

Popularity service 208 is configured to provide information to content control service 204 about the popularity of various content assets relative to the user base in a geographic region local to ISP cache 106. More specifically, popularity service 208 is configured to collect and analyze popularity data associated with various content assets and generated across different user bases spanning multiple geographic regions. Popularity service 208 is further configured to analyze that data and provide content control service 204 with popularity data for those same content assets or a subset of those content assets specific to the user base in a geographic region local to ISP cache 106. In other words, popularity service 208 is able to provide popularity data to content control service 204 that indicate how popular certain content assets are with respect to the user base local to ISP cache 106. In one embodiment, such popularity data considers not only the number of times each content asset is requested by the relevant group of users, but also considers how long each content asset is viewed, listened to, or used by users in the relevant group of users once the content asset is accessed. In other embodiments, the popularity data generated by popularity service 208 may be based on other metrics of popularity or a mix of other metrics of popularity along with the frequency and/or duration metrics described above. As explained in greater detail herein, content control service 204 uses the popularity data received from popularity service 208 to manage the content assets stored in ISP cache 106 and made available to client machines local to ISP cache 106, such as client machine 102.

Manifest service 202 is configured to locally manage the content assets stored in ISP cache 106 based on information received from content control service 204. In short, content control service 204 generates a title manifest based on the popularity data received from popularity service 208. The title manifest lists the content assets that are considered most popular by the user base local to ISP cache 106. Content control service transmits the title manifest to manifest service 202, and, as explained in greater detail herein, manifest service 202 is configured to populate ISP cache 106 with the content assets included in the title manifest. In this fashion, ISP cache stores content assets most relevant to the user base local to ISP cache 106, meaning that these content assets are ones most likely to be requested by users in local user base. By storing such content assets in ISP cache 106, the likelihood is increased that a user in the local user base, when requesting a content asset from content servers 108, will request a content asset that is stored locally in ISP cache 106. In cases wherein content assets can be accessed directly from ISP cache 106, accessing the content asset from a content delivery network, such as content delivery network 110, or some other network storage location, such as another ISP cache within the ISP network 104 or some other network, is avoided, thereby reducing overall network congestion within system 100.

As also shown in FIG. 2, in operation, the process of managing the content assets stored in ISP cache 106 and made available to client machines local to ISP cache 106 may include six steps. In step 1, ISP cache 106 registers with content control service 204, which informs content control service 204 as to the existence of ISP cache 106 and allows content control service 204 to obtain the IP address of ISP cache 106. In step 2, content control service 204 receives popularity data from popularity service 208 that is associated with various content assets. As set forth above, the popularity data indicate how popular certain content assets are with respect to the user base local to ISP cache 106. Content control service 204 generates a title manifest based on this popularity data that lists the content assets that are most popular among users in the user base local to ISP cache 106. In one embodiment, the title manifest is a ranked-order list of content assets. In other embodiments, the title manifest may be structured in any technically feasible way.

In step 3, content control service transmits the title manifest to ISP cache 106. In step 4, manifest service 202 attempts to rationalize the content assets stored in ISP cache 106 with the content assets included in the title manifest. In one embodiment, manifest service 202 compares the content assets listed in the title manifest to the content assets stored in ISP cache 106. Manifest service 202 then generates a script to retrieve any content assets listed in the title manifest that are not stored in ISP cache 106 from a content delivery network, such as content delivery network 110. In one embodiment, manifest service 202 configures the script such that new content assets are retrieved from the content delivery network only during non-peak network traffic hours. Among other things, such an approach reduces overall network congestion by avoiding increases in network traffic during peak network traffic hours. In addition, manifest service 202 deletes any content assets stored in ISP cache 106 that are not listed in the title manifest. In one embodiment, manifest service 202 generates a delete list where any content asset marked for deletion is temporarily stored for a period of time (e.g., a twenty-four hour period) so that service is not interrupted for users accessing content assets from ISP cache 106 that get marked for deletion by manifest service 202. At the end of the time period, the content assets included in the delete list are deleted from ISP cache 106.

Lastly, manifest service 202 generates a new title manifest for ISP cache 106. The new title manifest lists all content files stored in ISP cache 106 after manifest service 202 attempts to rationalize the content assets stored in ISP cache 106 with the content assets included in the title manifest received from content control service 204 in step 3. As those skilled in the art will appreciate, to the extent manifest service 202 has enough time to parse fully the title manifest received from content control service 204, retrieve from a content delivery network all content assets that are listed in the title manifest but not stored in ISP cache 106, and delete all content assets that are stored in ISP cache 106 but not listed in the title manifest, the new title manifest should be identical to the title manifest received from content control service 204 in step 3. However, to the extent that manifest service 202 does not have enough time to fully parse the title manifest received from content control service 204, retrieve all new content assets, and delete all content assets that no longer need to be stored in ISP cache 106, the new title manifest should be different than the title manifest received from content control service in step 3. In particular, in situations falling into the latter category, the new title manifest would only partially reflect the title manifest received from content control service 204 and would potentially indicate that one or more content assets listed in the title manifest received from content control service 204 are not yet stored in ISP cache 106 and/or that one are more content assets not listed in the title manifest received from content control service 204 are still stored in ISP cache 106.

In step 5, ISP cache 106 transmits a new title manifest to content control service 204. In step 6, content control service 204 transmits the new title manifest to content control protocol engine 206. The new title manifest informs content control protocol engine 206 as to which content assets are actually stored in ISP cache 106. Consequently, referring back now to FIG. 1, when client machine 102 requests a particular content asset from content servers 108, content control protocol engine knows whether that particular content asset is stored in ISP cache 106, based on the information included in the new title manifest, and also whether client machine 102 belongs to broadband ISP network 104. As described above in conjunction with step 2 of FIG. 1, when these two conditions are met, content control protocol engine 206 is configured to designate ISP cache 106 as the primary location in a hierarchical set of locations from where client machine 102 should attempt to access the particular content asset.

During ongoing operations, in one embodiment, content control service 204 is configured to push out title manifests to ISP cache 106 on a periodic basis that are updated to reflect more recent popularity data. Those title manifests are processed by manifest service 202 as set forth above in step 4, and the corresponding new title manifests generated by manifest service 202 are transmitted to and used by content control protocol engine 206 as set forth above in steps 5 and 6. In alternative embodiments, ISP cache 106 may be configured to request the updated title manifests from content control service 204 on a periodic basis. Again, those title manifests are processed by manifest service 202 as set forth above in step 4, and the corresponding new title manifests generated by manifest service 202 are transmitted to and used by content control protocol engine 206 as set forth above in steps 5 and 6.

Persons skilled in the art will appreciate that the network architectures illustrated in FIGS. 1 and 2 are exemplary only and do not in any way limit the scope of the present invention. All other technically feasible network architectures fall within the contemplated scope of the present invention. For example, the network environment may include internet exchanges and/or other network connected locations connected to one or more ISP networks.

Figure 3A:
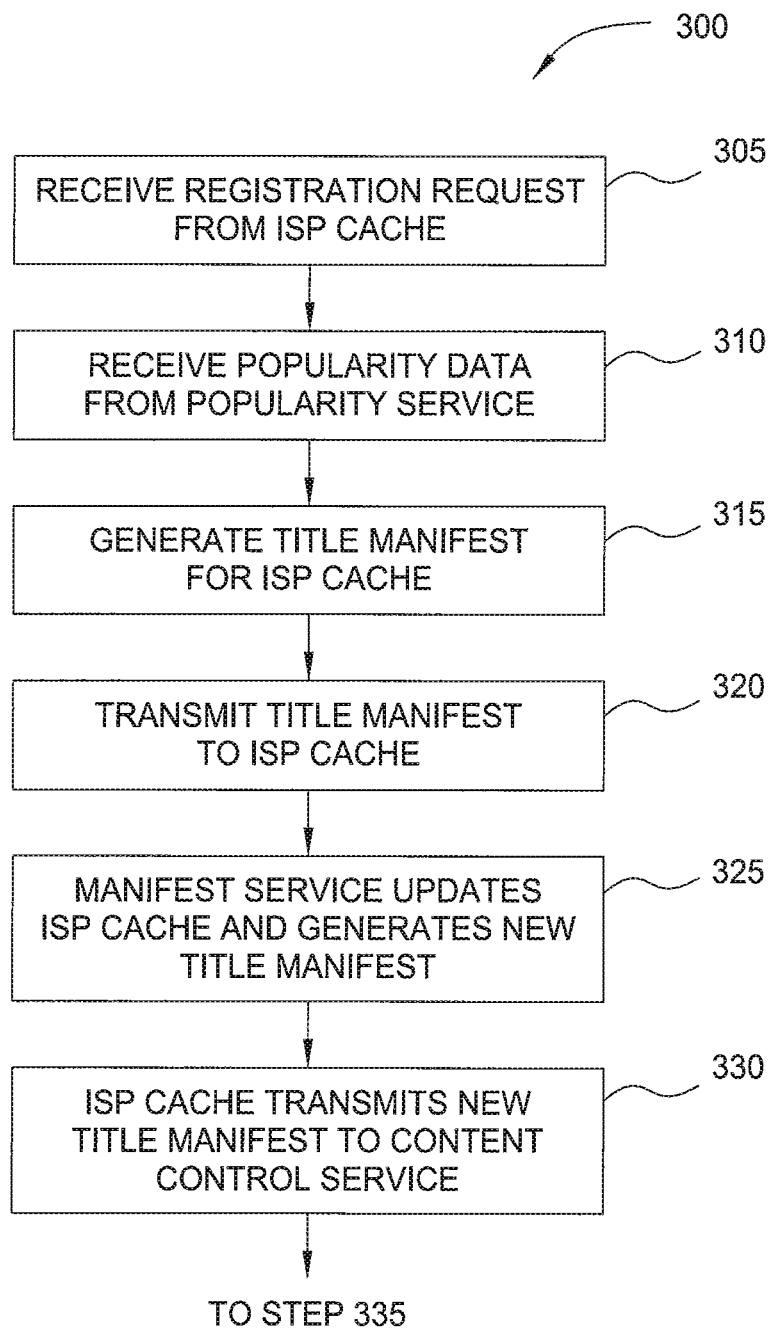
FIGS. 3A-3B set forth a flow diagram of method steps for updating content assets stored in an ISP cache, according to one embodiment of the present invention.
Figure 3B:
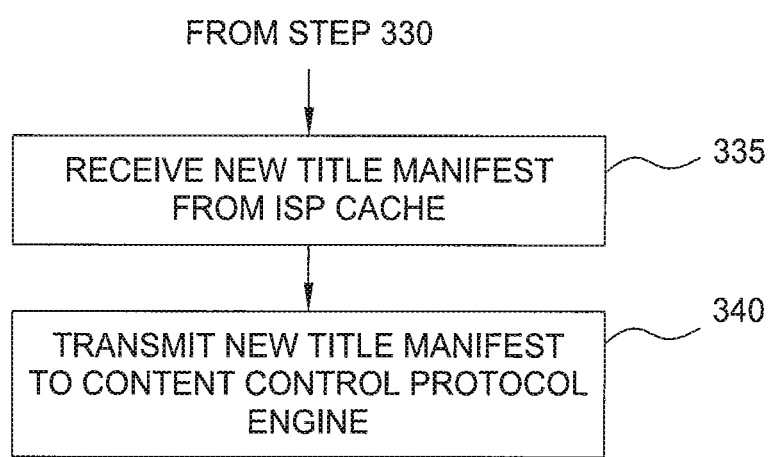

FIGS. 3A-3B set forth a flow diagram of method steps for updating content assets stored in an ISP cache, according to one embodiment of the present invention. Although the method steps are described in conjunction with FIGS. 1 and 2, persons skilled in the art will understand that any system configured to perform the method steps, in any order, falls within the scope of the present invention.

As shown, method 300 begins in step 305, wherein content control service 204 receives a registration request from ISP cache 106. In step 310, content control service 204 receives popularity data from popularity service 208 that is associated with various content assets. Again, the popularity data indicate how popular certain content assets are with respect to the user base local to ISP cache 106. In step 315, content control service 204 then generates a title manifest based on this popularity data that lists the content assets that are most popular among users in the user base local to ISP cache 106. In step 320, content control service 204 transmits the title manifest to ISP cache 106.

In step 323, manifest service 202 included within ISP cache 106 attempts to rationalize the content assets stored in ISP cache 106 with the content assets listed in the title manifest. After fully parsing the manifest list or after a predetermined amount of time has elapsed, manifest service 202 generates a new title manifest that lists all of the content files stored in ISP cache 106. As previously described herein, the new title manifest may be identical to the title manifest transmitted from content control service 204 or may be partially reflective of the title manifest transmitted from content control service 204. In step 330, ISP cache 106 transmits the new title manifest to content control service 204.

In step 335, content control service 204 receives the new title manifest from ISP cache 106, and, in step 340, content control service transmits the new title manifest to content control protocol engine 206. Subsequent to step 340, whenever client machine 102 requests a particular content asset from control servers 108, content control protocol engine 206 knows whether that particular content asset is stored in ISP cache 106, based on the information included in the new title manifest, and also whether client machine 102 belongs to broadband ISP network 104. When both of these conditions are met, content control protocol engine 206 is configured to designate ISP cache 106 as the primary location in a hierarchical set of locations from where client machine 102 should attempt to access the particular content asset, as previously described herein.

As described above, during ongoing operations, content control service 204 may push out title manifests to ISP cache 106 on a periodic basis that are updated to reflect more recent popularity data, or ISP cache 106 may request such updated title manifests from content control service 204 on a periodic basis. In either case, steps 320 through 340 of method 300 may be followed to process the updated title manifests and provide the corresponding new title manifests to content control protocol engine 206.

One advantage of the systems and methods described herein is that content assets are stored in an ISP cache local to a user base based on popularity data that identifies which content assets are most popular within that user base. Consequently, the likelihood that users within that user base will request content assets stored in the ISP cache is increased. In cases where requested content assets are stored in the ISP cache, the content assets may be accessed directly from the ISP cache, as opposed to accessing the content assets from content delivery networks, thereby reducing overall network traffic and congestion. In addition, updating the content assets stored in the ISP cache, including accessing new titles from content delivery networks, is done during off-peak network traffic hours. By avoiding increases in network traffic during peak network traffic hours, overall network congestion is reduced.

While the foregoing is directed to embodiments of the present invention, other and further embodiments of the present invention may be devised without departing from the basic scope thereof. For example, as used herein, a "content asset" refers to any type of audio, video, or audio/video title or file, including, for example, a movie, a video recording, an audio recording, an audio/video recording, or a video game.

In addition, aspects of the present invention may be implemented in hardware or software or in a combination of hardware and software. One embodiment of the present invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

We claim:

1. A system, comprising:
a cache residing at an internet service provider (ISP) location;
one or more content server machines; and
one or more content control server machines that:
transmit to the cache a first indication that the cache should store a first content asset,
receive from the cache a second indication that the cache does store the first content asset,
transmit to a client machine, in response to receiving a request for the first content asset from the client machine, a third indication that the cache is a primary location from which to request the first content asset and that the one or more content server machines are a secondary location from which to request the first content asset, wherein the third indication is generated in response to receiving the second indication.

2. The system of claim 1, wherein the third indication includes an internet protocol address associated with the cache.

3. The system of claim 2, wherein the third indication further includes at least one of an internet protocol address or a host name associated with the one or more content server machines.

4. The system of claim 1, wherein the one or content control servers generate a title manifest that includes a plurality of content assets based on popularity data and a geographic location associated with the cache and transmit the title manifest to the cache.

5. The system of claim 4, wherein the cache retrieves from the one or more content server machines content assets listed in the title manifest and not stored in the cache and deletes one or more content assets stored in the cache and not listed in the title manifest.

6. The system of claim 4, wherein the cache generates a new title manifest based on one more content assets retrieved from the one or more content server machines and one or more content assets deleted from the cache and transmits the new title manifest to the one or more content control servers.

7. The system of claim 1, wherein the client machine requests the first content asset from the secondary location when a request to the primary location for the first content asset does not result in the client machine receiving the first content asset.

8. A computer-implemented method for accessing content assets in a network, the method comprising:
    transmitting, to a cache residing at an internet server provider (ISP) location, a first indication that the cache should store a first content asset;
    receiving from the cache a second indication that the cache does store the first content asset;
    receiving a request from a client machine for the first content asset; and
    in response to receiving the request, transmitting to the client machine a customized asset selection indicating that the cache is a primary location from which to request the first content asset and that at least one content server machine is a secondary location from which to request the first content asset, wherein the customized asset selection is generated in response to receiving the second indication.

9. The computer-implemented method of claim 8, wherein the customized asset selection includes an internet protocol address associated with the cache.

10. The computer-implemented method of claim 9, wherein the customized asset selection further includes at least one of an internet protocol address or a host name associated with at least one content server machine.

11. The computer-implemented method of claim 8, further comprising generating a title manifest that includes a plurality of content assets based on popularity data and a geographic location associated with the cache, and transmitting the title manifest to the cache.

12. The computer-implemented method of claim 11, further comprising retrieving from at least one content server machine at least one content asset listed in the title manifest and not stored in the cache, and deleting at least one content asset stored in the cache and not listed in the title manifest.

13. The computer-implemented method of claim 11, further comprising generating a new title manifest based on one more content assets retrieved from at least one content server machine and one or more content assets deleted from the cache, and transmitting the new title manifest to at least one content control server.

14. One or more non-transitory computer-readable media including instructions that, when executed by one or more processors, cause the one or more processors to access content assets in a network by performing the steps of:
    transmitting, to a cache residing at an internet server provider (ISP) location, a first indication that the cache should store a first content asset;
    receiving from the cache a second indication that the cache does store the first content asset;
    receiving a request from a client machine for the first content asset; and
    in response to receiving the request, transmitting to the client machine a customized asset selection indicating that the cache is a primary location from which to request the first content asset and that at least one content server machine is a secondary location from which to request the first content asset, wherein the customized asset selection is generated in response to receiving the second indication.

15. The one or more non-transitory computer-readable media of claim 14, wherein the customized asset selection includes an internet protocol address associated with the cache.

16. The one or more non-transitory computer-readable media of claim 15, wherein the customized asset selection further includes at least one of an internet protocol address or a host name associated with at least one content server machine.

17. The one or more non-transitory computer-readable media of claim 14, further comprising generating a title manifest that includes a plurality of content assets based on popularity data and a geographic location associated with the cache, and transmitting the title manifest to the cache.

18. The one or more non-transitory computer-readable media of claim 17, further comprising retrieving from at least one content server machine at least one content asset listed in the title manifest and not stored in the cache, and deleting at least one content asset stored in the cache and not listed in the title manifest.

19. The one or more non-transitory computer-readable media of claim 17, further comprising generating a new title manifest based on one more content assets retrieved from at least one content server machine and one or more content assets deleted from the cache, and transmitting the new title manifest to at least one content control server.

* * * * *